(12) United States Patent
Wernersbach et al.

(10) Patent No.: US 9,957,119 B2
(45) Date of Patent: May 1, 2018

(54) LINEAR DRIVE TRANSPORT SYSTEM AND METHOD

(71) Applicant: ROCKWELL AUTOMATION TECHNOLOGIES, INC., Mayfield Heights, OH (US)

(72) Inventors: Glen C. Wernersbach, Cincinnati, OH (US); Keith G. Jacobs, Loveland, OH (US); Dean L. Higgins, Lakeland, MN (US); James A. Craver, Gilford, NH (US); Peter T. Boyle, Bayport, NY (US)

(73) Assignee: Rockwell Automation Technologies Inc., Mayfield Heights, OH (US)

( * ) Notice: Subject to any disclaimer, the term of this patent is extended or adjusted under 35 U.S.C. 154(b) by 0 days. days.

(21) Appl. No.: 15/456,231

(22) Filed: Mar. 10, 2017

(65) Prior Publication Data
US 2017/0183170 A1   Jun. 29, 2017

Related U.S. Application Data

(63) Continuation of application No. 14/563,687, filed on Dec. 8, 2014, now Pat. No. 9,611,107.

(51) Int. Cl.
*B65G 54/02* (2006.01)
*B65G 47/64* (2006.01)

(52) U.S. Cl.
CPC .......... *B65G 54/02* (2013.01); *B65G 47/642* (2013.01); *B65G 47/643* (2013.01); *B65G 54/025* (2013.01)

(58) Field of Classification Search
CPC .... B65G 47/642; B65G 47/643; B65G 43/00; B65G 54/02; B65G 54/025; B65G 2203/0216; B65G 2203/0283
See application file for complete search history.

(56) References Cited

U.S. PATENT DOCUMENTS 4,305,334 A * 12/1981 Augenreich ............ B60L 13/03
            104/138.1
5,156,093 A * 10/1992 Azukizawa ............ B60L 13/08
            104/130.02
(Continued)

FOREIGN PATENT DOCUMENTS

DE      102008007768 A1    8/2009
EP         2779390 A2      9/2014
(Continued)

OTHER PUBLICATIONS

Extended EP Search Report for EP Application No. 15197911.9 dated May 10, 2016; 9 Pages.
(Continued)

*Primary Examiner* — Leslie A Nicholson, III
*Assistant Examiner* — Keith R Campbell
(74) *Attorney, Agent, or Firm* — Fletcher Yoder, P.C.

(57) ABSTRACT

A linear drive transport system includes a plurality of fixed tracks and a junction track disposed on a conveyor configured to align the junction track with each of the plurality of fixed tracks. The plurality of fixed tracks and the junction track include one of electromagnetic coils or permanent magnets arranged in series along the respective plurality of fixed tracks and the junction track. In addition, the linear drive transport system includes a plurality of movers configured to move along the fixed tracks and configured to transition between each of the plurality of fixed tracks and the junction track when aligned, wherein the movers comprise the other of the electromagnetic coils or the permanent magnets.

20 Claims, 7 Drawing Sheets

(56) References Cited

U.S. PATENT DOCUMENTS

| | | | |
|---|---|---|---|
| 5,947,361 A | | 9/1999 | Berger et al. |
| 8,408,381 B2 | | 4/2013 | Murakami et al. |
| 8,616,134 B2 | | 12/2013 | King et al. |
| 8,896,241 B2 | | 11/2014 | Wernersbach et al. |
| 9,511,947 B2 | * | 12/2016 | Pollack .............. G01N 35/0095 |
| 2005/0256774 A1 | | 11/2005 | Clothier et al. |
| 2013/0119897 A1 | * | 5/2013 | Wernersbach .......... H02P 31/00 318/135 |
| 2014/0265645 A1 | * | 9/2014 | Jacobs ................ H02K 41/031 310/12.15 |

FOREIGN PATENT DOCUMENTS

| | | | | |
|---|---|---|---|---|
| GB | 2024750 A | | 1/1980 | |
| WO | 2010085670 A1 | | 7/2010 | |
| WO | 2015162182 A1 | | 10/2015 | |
| WO | WO 2015162182 A1 | * | 10/2015 | .............. B26D 7/32 |

OTHER PUBLICATIONS

Rockwell Automation, iTRAK The Intelligent Track System, "iTRAK Merge & Divert" video published via YouTube on Sep. 29, 2014, accessed on Nov. 24, 2014 via http://youtu.be/3rqs_Kzg8-s.

* cited by examiner

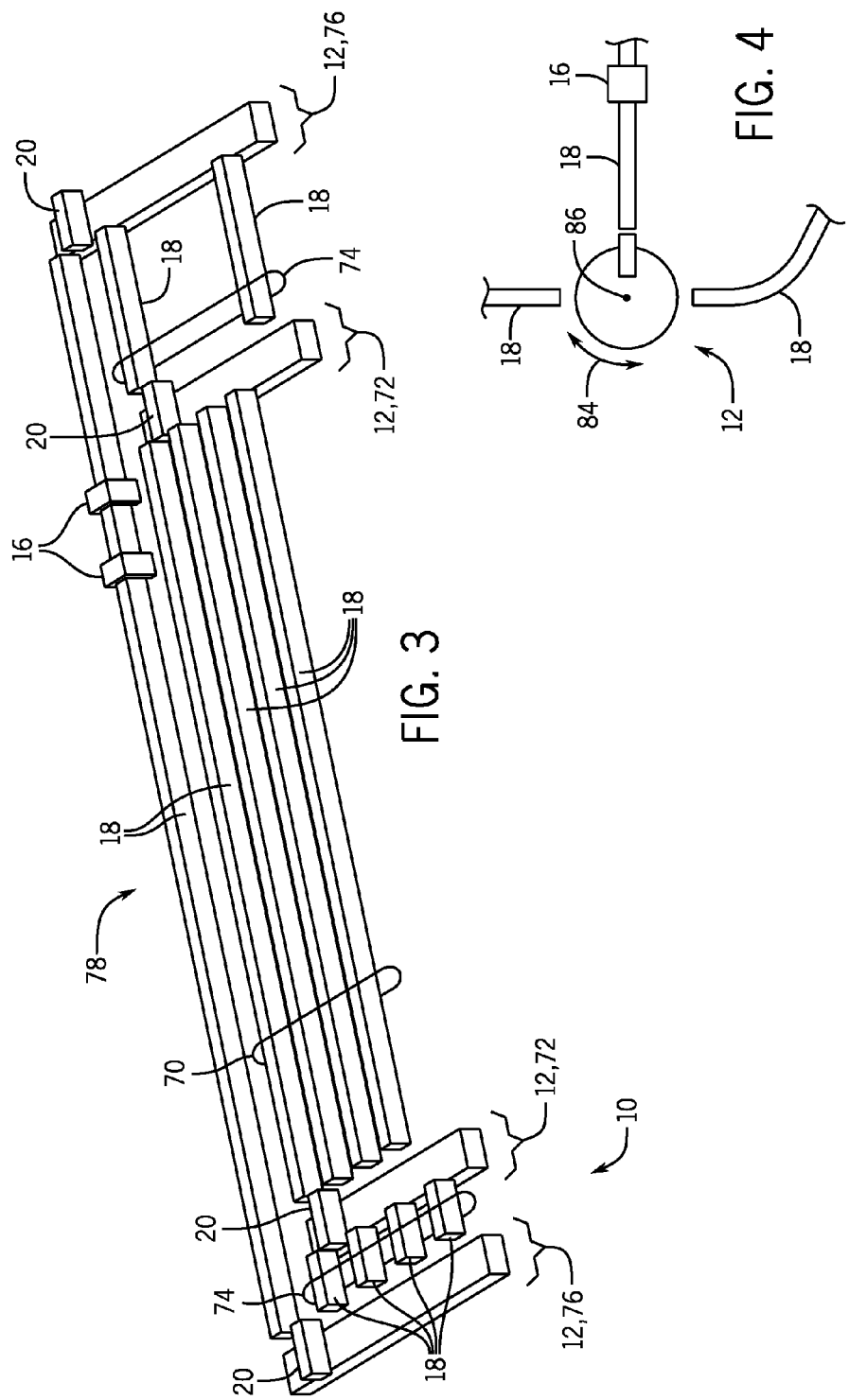

LINEAR DRIVE TRANSPORT SYSTEM AND METHOD

CROSS REFERENCE TO RELATED APPLICATION

This application is a continuation of and claims priority to U.S. application Ser. No. 14/563,687, entitled "LINEAR DRIVE TRANSPORT SYSTEM AND METHOD," filed Dec. 8, 2014, which is herein incorporated by reference in its entirety.

BACKGROUND

The present disclosure is generally directed to linear drive transport systems and methods. More particularly, present embodiments are directed to systems and methods for conveyance management, including monitoring and control, with a linear drive transport system.

A linear drive or linear motor generally includes an electromagnetic device that operates to provide motion along a path or "linear motion" rather than the rotary motion typically provided by a standard electric motor. In operation, a linear drive typically produces electromotive force in a conductor by changing a magnetic field about the conductor. Specifically, linear drives generally function based on interactions between electromagnets and permanent magnets. Coils of the electromagnets can be charged to create magnetic fields that interact with permanent magnets to provide motion. There are two fundamental linear drives categories, which may be referred to as moving magnet (or fixed coil) linear drives and moving coil (or fixed magnet) linear drives. In a moving magnet linear drive, the coils are fixed within a track or track segments and movers along the track include permanent magnets. In a moving coil linear drive, permanent magnets are fixed within a track or track segments and movers along the track include coils. Certain functional characteristics of these two categories are different and often play a key role it determining which category to employ for a particular purpose. For example, moving magnet linear drives allow for unpowered movers whereas moving coil linear drives generally require that power be provided to the electromagnet on each mover. As another example, moving coil linear drives are often capable of greater movement precision for the movers than moving magnet linear drives.

Linear drives are often used in transport systems that facilitate different types of industrial operations. For example, linear drive transport systems may be utilized to convey products to different areas in a manufacturing or packaging operation. However, due to the nature of the interaction between movers and track segments in linear drive systems, most linear drives include straight or circular tracks. This has caused limited employment of linear drives due to a lack of versatility in traditional arrangements. It is now recognized that it is desirable to have more versatility in conveyance paths for linear drives in certain industrial operations.

BRIEF DESCRIPTION

Present embodiments include a linear drive transport system. The system includes a plurality of fixed tracks and a junction track disposed on a conveyor configured to align the junction track with each of the plurality of fixed tracks. The plurality of fixed tracks and the junction track include electromagnetic coils or permanent magnets arranged in series along the respective plurality of fixed tracks and the junction track. Further, present embodiments include a plurality of movers configured to move along the fixed tracks and configured to transition between each of the plurality of fixed tracks and the junction track when aligned, wherein the movers comprise the other of the electromagnetic coils or the permanent magnets.

Present embodiments also include a shuttle system for a linear drive transport system. The shuttle system includes a conveyor configured to move along a path that is transverse to a plurality of linear drive tracks that are configured to transport a linear drive mover in one of a moving magnet configuration or a moving coil configuration. Further, the shuttle system includes a junction track disposed on the conveyor, wherein the junction track is configured to transport the linear drive mover in the same one of the moving magnet configuration or the moving coil configuration as the plurality of linear drive tracks. Further, the conveyor is configured to align the junction track with at least a subset of the plurality of linear drive tracks to facilitate transfer of the linear drive mover there between.

Present embodiments also include a method of positioning movers in a linear drive transport system. The method includes aligning a junction track with a first fixed track of a plurality of fixed tracks by moving the junction track with a conveyor on which the junction track is disposed. Further, the method includes impelling at least one mover along the first fixed track, transitioning the at least one mover from the first fixed track to the junction track, aligning the junction track with a second fixed track of the plurality of fixed tracks using the conveyor, and transitioning the at least one mover to the second fixed track under the influence of electromagnetic force resulting from interaction between at least one electromagnet coil and at least one permanent magnet.

DRAWINGS

These and other features, aspects, and advantages of the present disclosure will become better understood when the following detailed description is read with reference to the accompanying drawings in which like characters represent like parts throughout the drawings, wherein:

FIG. 3 is a schematic, perspective view of a linear drive transport system incorporating numerous tracks and shuttling systems in accordance with present embodiments;

FIG. 4 is a schematic, overhead view of a linear drive transport system incorporating a turntable for a conveyor in accordance with present embodiments;

DETAILED DESCRIPTION

Present embodiments are directed to linear drive transport systems and components thereof. A linear drive transport system employs linear drives that utilize principles of electromagnetic propulsion to transport movers along a track. The linear drive transport system may employ a moving magnet configuration or a moving coil configuration. In both configurations, movers are impelled under the influence of electromagnetic force resulting from interaction between two electromagnetic fields (e.g., interaction between one or more electromagnetic coils and one or more permanent magnets). For example, in a moving magnet configuration, a mover may include an array of permanent magnets that are forced along as a result of interaction between magnetic fields of the array and magnetic fields generated by electromagnet coils in a track. Similarly, in a moving coil configuration, a mover may include one or more electromagnet coils and a track may include permanent magnets that cooperate to impel the mover along the track. In some embodiments, different combinations of magnets may be used (e.g., electromagnets alone may be used).

Traditionally, the tracks utilized in linear drive transport systems are essentially configured in a straight line or loop (e.g., oval) configurations. It is now recognized that these traditional track configurations often make it difficult to pass articles (e.g., products being transported) along variable paths and to transfer articles between paths. For example, in traditional configurations, the ability to divert an article from a central path to one of several diverging paths may require the use of pucks and complicated track switching mechanisms, wherein the pucks are movers that are not physically attached to the track and thus free to move from a central path to any of several diverging paths that extend from the central path. However, this type of configuration may lack sufficient stability and positional accuracy for certain operations. Further, such diverging paths typically require paths that have curves, which can complicate system assembly. For example, in a moving magnet configuration, tracks typically comprise laminates that are assembled to form the tracks. If a curved track is desired, specially designed laminate assemblies may be required, which it is now recognized can cause substantial inefficiencies in system manufacturing and assembly.

Figure 1:
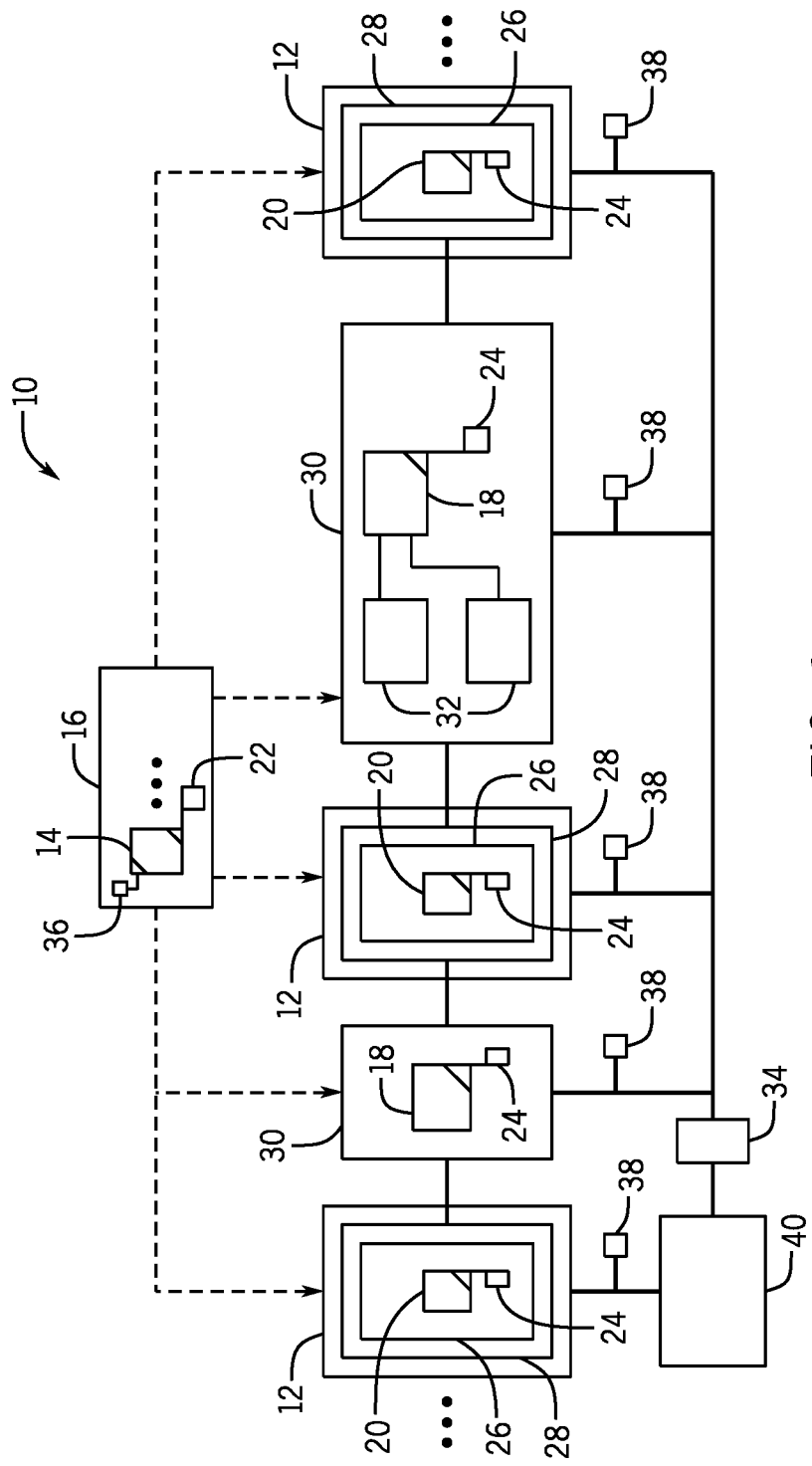
FIG. 1 is a schematic representation of a linear drive transport system in accordance with present embodiments.

Present embodiments are directed to incorporation of at least one shuttle system with a linear drive transport system to facilitate divert and merge transport operations for movers of the system. FIG. 1 is a schematic representation of a linear drive transport system (LDT system) 10 in accordance with present embodiments. The LDT system 10 includes a plurality of shuttle systems 12 that facilitate transfer of a mover body 14, which is representative of a central physical structure of one or a plurality of movers 16, between separate tracks 18 of the LDT system 10. Thus, the mover 16 and any associated article (e.g., products disposed on or otherwise engaged by the mover 16) being transported by the LDT system 10 may be merged onto a single track from multiple tracks, diverted to separate tracks from a single track, or otherwise maneuvered throughout a system of tracks (e.g., tracks 18). The mover 16 may be positioned along any of the various tracks 18 or on any of the various shuttle systems 12 at certain points during system operation. Accordingly, the mover or movers 16 are schematically represented in FIG. 1 as capable of being positioned at various locations throughout the LDT system 10. Likewise, in certain embodiments, each of a plurality of movers 16 may be positioned at different locations throughout the LDT system 10.

The shuttle systems 12 are each illustrated as including one or more junction tracks 20, which generally operate in the same manner as the plurality of tracks 18 they interact with. That is, the junction tracks 20 may employ one of permanent magnets 22 or electromagnet coils 24 to interact with the other of permanent magnets 22 or electromagnet coils 24 in the movers 16 to provide motivation along the tracks 18 and junction tracks 20 using electromagnetic force. In the illustrated embodiment, the tracks 18 and the junction tracks 20 operate with the movers 16 as a linear drive in a moving magnet configuration. Accordingly, the mover body 14 is illustrated as including the permanent magnet (e.g., an array of permanent magnets) 22, while the tracks 18 and junction tracks 20 are illustrated as including the electromagnet coils 24. In other embodiments, the mover body 14 may include the electromagnet coils 24, while the tracks 18 and junction tracks 20 include the permanent magnets 22.

Unlike certain fixed tracks (e.g., at least a subset of tracks 18) that the shuttle systems 12 interact with, the junction tracks 20 are each disposed on a mover 26 of the corresponding shuttle system 12, wherein the mover 26 is disposed on, coordinates with, or incorporates a conveyor 28 of the corresponding shuttle system 12. In some embodiments, the junction track 20 is disposed on the mover 26 in such a way as to be essentially integral therewith and the junction track 20 basically functions as both the mover 26 and the junction track 20. In other embodiments, the junction track 20 is disposed on but delineated as separate from the mover 26. For example, in one embodiment, the junction track 20 may be disposed on a surface of a conveyor belt, wherein the belt surface is considered a mover 26 of the shuttle system 12 and an associated drive mechanism (e.g., chain) of the conveyor belt is considered the conveyor 28 of the shuttle system 12 in accordance with present embodiments. However, the conveyor 28 may also include a rotary table, a linear drive, or other types of conveyance mechanisms in accordance with present embodiments. For example, the mover 26 on which the junction track 20 is disposed may be a mover 26 of a linear drive system that is in a moving magnet configuration or a moving coil configuration and functioning as the conveyor 28. More specifically, in such an embodiment, the mover 26 and an associated track of the linear drive system may cooperate to function as the conveyor 28. In some embodiments, the junction track 20 may be disposed on the mover 26 in a manner that makes it integral with the mover 26 such that a single component is both the junction track 20 and the mover 26. As indicated above, the shuttle systems 12 may incorporate more than one junction track 20 on each mover 26. Further, multiple movers 26 may be positioned on one conveyor in a shuttle system 12. Further still, a single shuttle system 12 may include multiple conveyors 28.

The movers 26 and conveyors 28 of the shuttle systems 12 that maneuver the junction tracks 20 are configured to align the respective junction tracks 20 with one of a plurality of other tracks (e.g. fixed tracks 18) to facilitate transfer of movers 16 there between. Accordingly, the movers 16 (and articles being moved) can be maneuvered to different locations throughout the LDT system 10 for processing or warehousing. For example, certain tracks 18 may be considered components of particular system modules 30 and these system modules 30 may include certain process features 32 that the movers 16 interact with by traveling along specific tracks in the system module 30. Specifically, for example, the mover 16 may be directed along particular tracks 18 in the system module 30 such that it passes through a process feature 32 (e.g., an oven, a rinse chamber, a deposition chamber, a packaging robot) and facilitates processing of an article being carried by the mover 16. The mover 16 may be directed along a particular path 18 through such a process feature 32 and then transitioned by a shuttle system 12 to a different path 18 in the system module for interaction with a different process feature 32. In other embodiments, such features may be utilized to transfer articles to particular areas for warehousing.

With the foregoing processing and warehousing techniques in mind, it is now recognized that it is also desirable to facilitate determining where particular movers 16 or related articles currently reside and where they have previously been within the LDT system 10. It may be desirable to determine where a particular mover 16 should be directed, where it previously resided, or where it is currently stored or located. Accordingly, in addition to using a position feedback board 34, which is used for detection and control in linear drives, present embodiments may monitor the mover 14 using tags 36 and tag detectors 38. A tag 36 (e.g., a bar code, RFID tag, text capable of being identified by Optical Character Recognition (OCR)) may be disposed on the mover 14 (or articles being moved) and detected by the tag detectors 38 positioned throughout the LDT system 10. The detectors 38 may be positioned proximate exits and entries to tracks 18 and junction tracks 20. For example, the detectors 38 may include bar code readers, an OCR system, or RFID detectors positioned adjacent, positioned over, or integrated into the tracks 18 or junction tracks 20 in an orientation that facilitates detection of the tags 36 as they pass near the movers 16. Information detected or accumulated in this way may be communicated to a supervisory controller 40 to facilitate tracking of mover locations within the system, determining where movers 16 should proceed for further processing, tracking batches and serialization, and so forth. The supervisory controller 40 may interact with the position feedback board 34 to further identify or confirm mover locations and to facilitate positional control.

Figure 2:
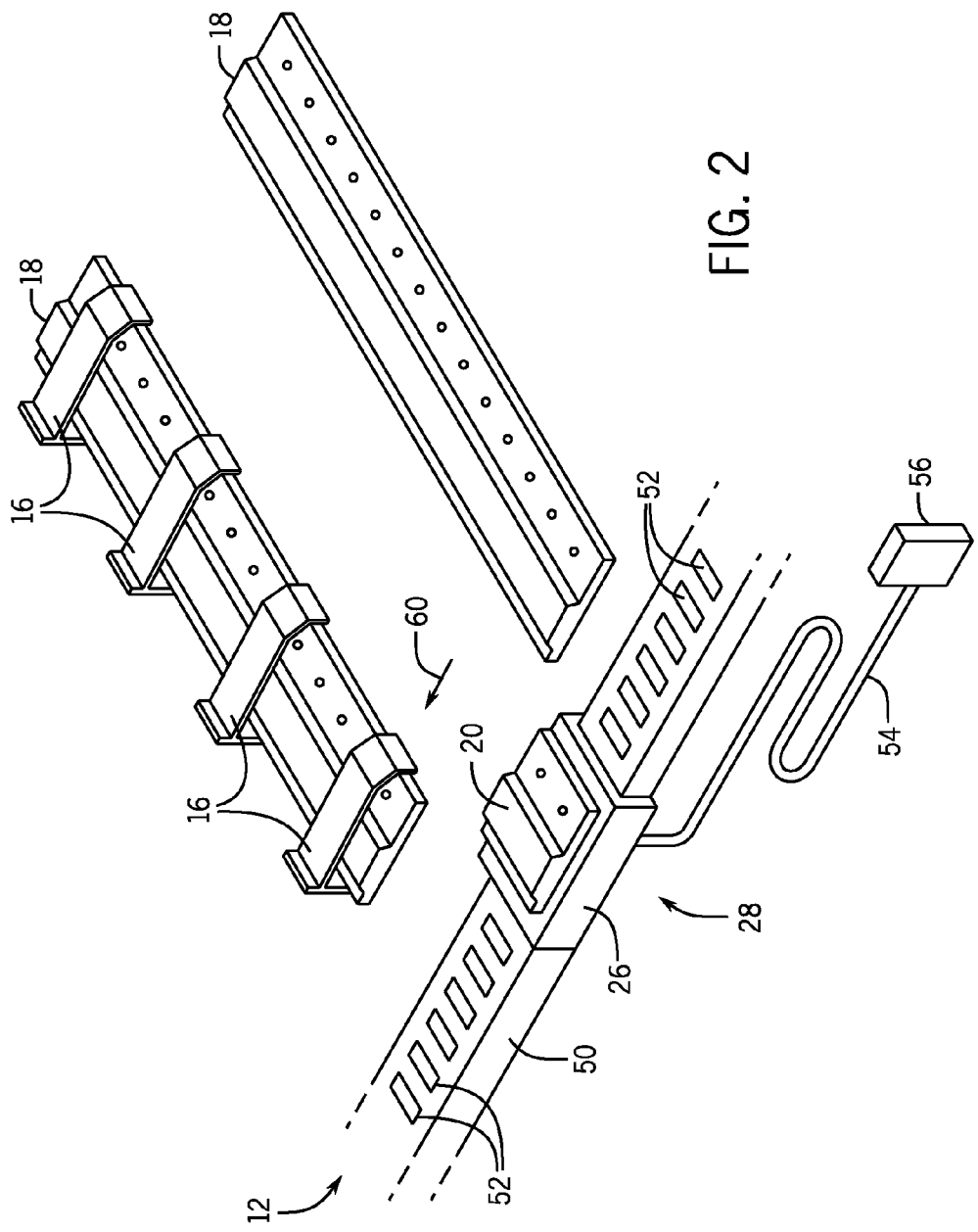
FIG. 2 is a perspective view of a pair of tracks and a shuttle system in a linear drive transport system in accordance with present embodiments.

FIG. 2 is a perspective view of a portion of an LDT system 10 in accordance with present embodiments. The LDT system 10 of FIG. 2 includes a pair of fixed tracks 18 and a shuttle system 12 configured to maneuver movers 16. In the illustrated embodiment, the tracks 18 are linear drive tracks configured for operation in a moving magnet configuration. Further, the junction track 20 is essentially identical to a segment of the fixed tracks 18 but positioned on (e.g., integral with) a mover 26 of a linear drive configured for operation in a moving coil configuration. Indeed, the shuttle system 12 of FIG. 2 includes a conveyor 28 defined by the mover 26 supporting the junction track 20 and a rail 50 including a series of embedded permanent magnets 52. The conveyor 28 further includes a tether 54 for providing power to the mover 26 from a corresponding power supply 56. In the illustrated embodiment, the junction track 20 is in the process of being aligned with the one of the fixed tracks 18 on which the movers 16 are positioned, as illustrated by arrow 60. Once the conveyor 28 properly aligns the junction track 20 and the track 18, at least one of the movers 16 may be transitioned onto the junction track 20 from the track 18. More specifically, a mover 16 may be impelled from the fixed track 18 onto the junction track 20 using electromagnetic forces generated using principles of induction. To achieve very precise alignment between the junction track 20 and other tracks 18, it may be desirable to use a moving coil configuration for the conveyor 28 (as illustrated), which may facilitate more finely controlled positioning than is typically available using a moving magnet linear drive configuration. However, in other embodiments, different configurations may be employed.

Like the fixed track 18 from which the junction track 20 receives the mover 16, the junction track 20 may also coordinate with the mover 16 to impel it onto the other track 18 after the conveyor 28 repositions the junction track 20 into alignment therewith. In some embodiments, other tracks 18 may already be in alignment with the track 18 from which the mover 16 is being transferred such that the junction track 20 operates much like a gateway. Further, in some embodiments, segments of track 18 may be utilized as places for parking movers 16 until it is desirable to reposition them. It should be noted that the conveyor 28 that maneuvers the junction track 20 generally operates to move the junction track 20 in a direction that is transverse to the direction a mover 16 will travel on the tracks 18 (e.g., fixed tracks) that the junction track 20 is interacting with. This may include moving in one or more directions (e.g., horizontally, vertically, angled) relative to the tracks 18. In the illustrated embodiment, the tracks 18 and shuttle system 12 are linear and positioned cross-wise to one another. Further, the system 10 is configured such that movers 16 may pass from one of the tracks 18 onto the junction track 20 by passing over a side of the junction track 20 facing the one of the tracks 18 and then exit onto one of the tracks 18 by passing across the same side of the junction track 20.

FIG. 3 is a schematic, perspective view of one embodiment of the LDT system 10 in accordance with the present disclosure. The LDT system 10 of FIG. 3 includes a plurality of fixed tracks 18 that may coordinate with movers 16 in a moving magnet orientation. Similarly, the shuttle systems 12 in FIG. 3 include junction tracks 20 that coordinate with the movers 16 in a moving magnet configuration to facilitate transfer of the movers 16 between the tracks 18. In other embodiments, different configurations may be used. For example, combinations of moving magnet and moving coil configurations may be employed. Further, the shuttle systems 12 may employ any of various and mixed configurations in accordance with present embodiments. For example, some or all of the shuttle systems 12 in the embodiment illustrated by FIG. 3 may employ a moving magnet linear drive system, wherein the junction track 20 is the moving magnet while also being a electromagnetic track for the movers 16. As another example, some or all of the shuttle systems 12 may include traditional belt systems or turntables as components for maneuvering the junction track 20, which operates with the movers 16 in a linear drive configuration (e.g., moving magnet or moving coil configuration).

Specifically, in the illustrated embodiment, four of the tracks 18, as indicated by reference numeral 70, are positioned between two inner sets of shuttle systems 12, which are indicated by reference numeral 72. Additional tracks 18, as indicated by reference numeral 74, are positioned outside of the inner shuttle systems 72 and between outer shuttle systems 12, as indicated by reference numeral 76. Further, one of the fixed tracks 18, as indicated by reference numeral 78, provides what may be considered a bypass around the other tracks 70, 74 and directly between the outer shuttle systems 76. The four tracks 70 may be configured to facilitate interaction between payloads (articles being carried by movers 16 positioned on the tracks 70) and certain process features 32 (not shown) configured to perform acts on the payloads. The inner shuttle systems 72 may facilitate transferring the movers 16 between the various tracks 18 and to the outer shuttle systems 76. As an example, certain products may be moved along one of the tracks 70 in a first direction, transferred to a second of the tracks 70 by an inner shuttle system 72, and then moved along the second of the tracks 70 in a direction opposite to the first direction. This may be done to pass the payloads through certain process features 32 to achieve an end goal for the products. The fixed track 78 may be used to bypass all of the four tracks 70, which may allow for processing payloads along each of the four tracks 70 in the same direction. Some of the tracks 18, such as the additional tracks 74 may be utilized as holding areas or areas for parking movers 16 during certain phases or transitions in processing.

The embodiment illustrated by FIG. 3 generally illustrates pathways (tracks 18) that are aligned within the same plane and in parallel. It should be noted that geometric terms such as "parallel" and "perpendicular" are presently utilized to facilitate general discussion of geometric orientations and should not be understood as requiring a precise mathematical relationship that would be essentially unattainable in a practical application. Because the tracks 18 are in parallel, the shuttle systems 12 of FIG. 3 operate to move the junction tracks 20 in a direction perpendicular to the tracks 18. This may be beneficial and present embodiments include systems wherein only tracks 18 in parallel arrangements or parallel and perpendicular arrangements or utilized to facilitate transfer between tracks using operations along straight lines. However, in other embodiments, the junction tracks 20 may be moved in other manners to traverse the tracks 18 and facilitate transitioning of movers 16 to other tracks. Further, in some embodiments, the tracks 18 may not be straight lines but curved lines. For example, FIG. 4 illustrates a schematic, overhead view of a shuttle system 12 interacting with three tracks 18 that may include curved portions. In the illustrated embodiment, the shuttle system 12 includes a turntable 82 that rotates (as indicated by arrow 84) about an axis 86 such that the junction track 20 can be aligned with each of the tracks 18. Thus, the mover 16 can be received onto the junction track 20, the junction track 20 can be repositioned by the turntable 82 into alignment with another of the tracks 18, and the mover 16 can be transitioned to the other track 18. The force used to transition the mover 16 from the track 18 to the junction track 20 and from the junction track 20 to the track 18 may be generated from interactions between magnets and electromagnets, as discussed above. In the illustrated embodiment, the shuttle system 12 is configured such that the mover 16 enters the junction track 20 from a particular side of the junction track 20 and exits from the same side of the junction track 20.

Figure 5:
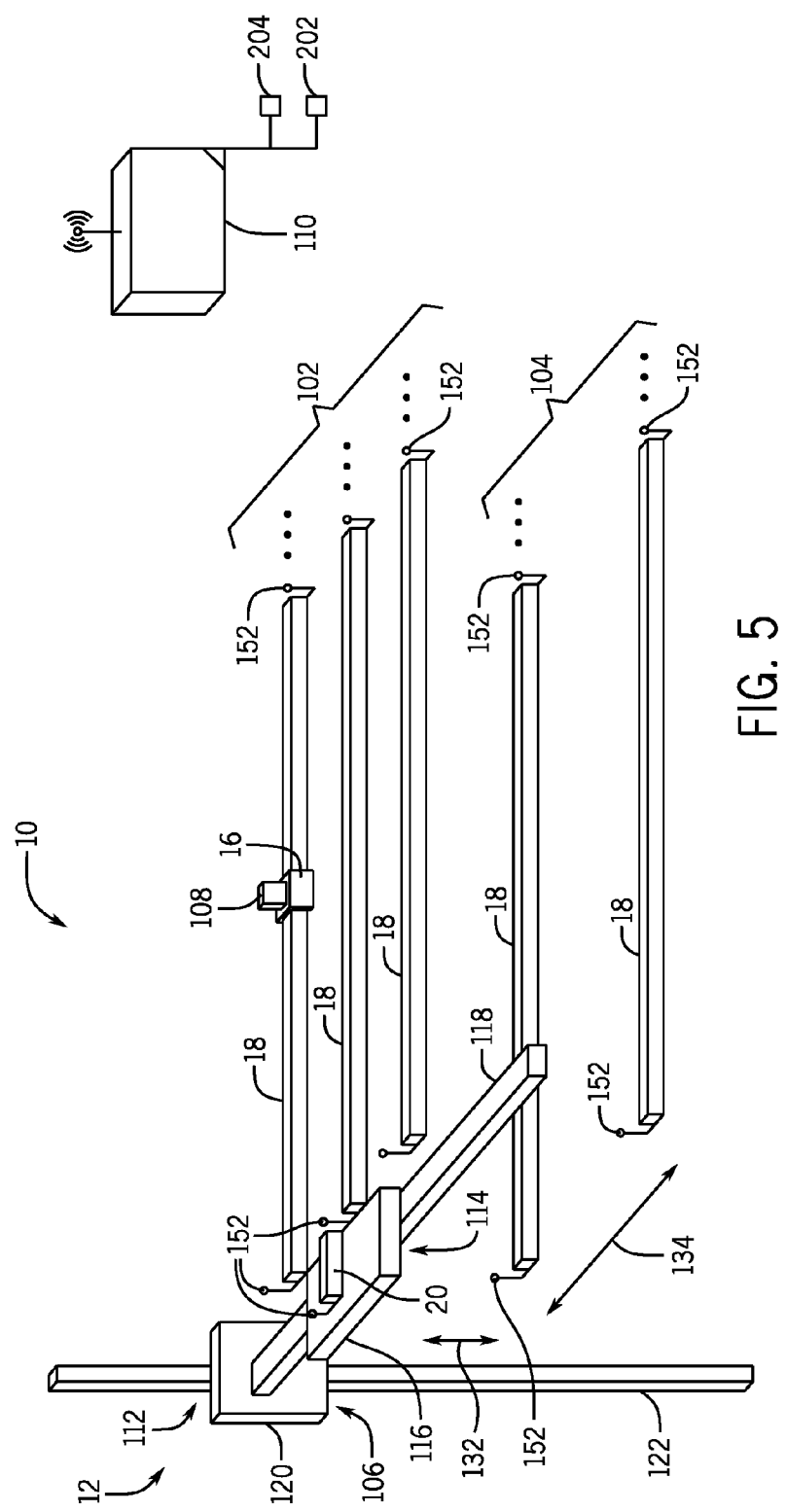
FIG. 5 is a schematic, perspective view of a linear drive transport system configured to maneuver at least one mover between multiple planes of operation in accordance with present embodiments.

FIG. 5 is a schematic, perspective view of the LDT system 10 in accordance with and embodiment of the present disclosure. The embodiment illustrated in FIG. 5 includes a first track group 102 arranged in a first plane of operation, a second track group 104 arranged in a second plane of operation, a dual-axis shuttle system 106, a mover 16 supporting an article 108, and a supervisory control system 110. The mover 16 may be configured to physically attach with the various tracks 18 and the junction track 20 (e.g., a carriage with engagement arms and wheels) or configured to sit on top of the various tracks 18 and the junction track 20 (e.g., a puck that moves along a path without physically coupling). The dual-axis shuttle system 106 includes a vertical linear drive 112 and a horizontal linear drive 114. These linear drives 112, 114 may operate in a moving magnet or moving coil configuration. The dual-axis shuttle system 106 is configured to facilitate transfer of the mover 16 and any payload it is carrying (e.g., the article 108) within and between the first and second track groups 102, 104. In the illustrated embodiment, this is achieved by supporting the junction track 20 on a mover 116 disposed on a horizontal track 118 of the horizontal linear drive 114, which is supported by a mover 120 on a vertical track 122 of the vertical linear drive 112. Specifically, the vertical linear drive 112 includes the vertical track 122 and the mover 120, and the horizontal linear drive 114 includes the horizontal track 118 and the mover 116. When the mover 16 (and/or the article 108) is positioned on the junction track 20, the vertical linear drive 112 enables transport of the mover 16 along a vertical axis, as indicated by arrow 132, while the horizontal drive 114 enables transport of the mover 16 along a horizontal axis, as indicated by arrow 134. In other embodiments, the vertical and horizontal linear drives 112, 114 may include other types of conveyors (e.g., a chain conveyor, a belt conveyor, a rotary table). In some embodiments, this may include the use of multiple vertical and horizontal linear drives 112, 114, which may use the same vertical track 122 or multiple horizontal tracks 118 on the same mover 120. Further, in other embodiments, different configurations may facilitate transfer of the mover 16 along an angled or curved axis and certain tracks 18 may include curves. For example, in some embodiments, the vertical track 122 may be a vertical segment of a loop track.

Present embodiments may include the position feedback board 34, which may represent a plurality of such boards and encoder systems, to allow for control and monitoring of paths by representing each mover 16 disposed on a track 18 as a linear axis in a control system. The feedback board 34 may be configured to employ magnetic feedback created by the interaction of movers and track segments to achieve this tracking and control function. Transfer from one track 18 to a junction track 20 could be handled by commanding an axis (a mover 16) to the end of the track 18 on which it is disposed after aligning the end of the track 18 with the junction track 20. At the end of the track 18, the axis would be identified in the encoder system of the beginning of the junction track 20 and the axis could be commanded to transfer from the track 18 to the junction track 20.

The ability to move articles 108 with movers 16 into different operational planes and in different directions with the shuttle system or systems 12 and tracks 18 may facilitate numerous different industrial processes, including processing and warehousing operations. Indeed, present embodiments are directed to smart warehousing and tracking operations for certain processes. For example, the embodiment illustrated by FIG. 5 includes the supervisory controller 110, which coordinates with sensors 152, which may represent tag detectors 38, that are disposed proximate entries/exits to the tracks 18 and the junction track 20. The sensors 152 may communicate, via a network (e.g., a wireless network), with the supervisory controller 110 to monitor the location of movers 16 and/or articles 108. For example, certain articles 108 or movers 16 may include identifying features (e.g., bar code or RFID tags) that can be detected by the sensors 152. Information related to the location of the sensors 152 and corresponding detection of a particular tag (e.g., tag 36) can be relayed to the supervisory controller 110.

The supervisory controller 110, which may represent multiple controllers, includes one or more memories 202 (e.g., a hard drive or other non-transitory computer-readable medium) and processors 204. The supervisory controller 110 may be configured to employ an overlord abstraction or virtualization of the LDT system 10 to facilitate smart warehousing, serialization, process management, and so forth. This virtualization may be achieved by employing a software object on the controller 110 or on a separate device with a memory that is in communication with the supervisory controller 110. The supervisory controller 110 may be configured to determine which paths (e.g., tracks 18) are available (e.g., include space that can be utilized) and distribute movers 16 to maximize throughput. This may facilitate removal of certain paths from operation for maintenance purposes while utilizing available paths to make up for the absence of the path being repaired.

In operation, in addition to the tracking provided by the feedback board 34, present embodiments utilize the supervisory controller 110 and the sensors 152 to keep track of mover identities and/or article identities (tag IDs) as they move throughout the LDT system 10. This includes tracking articles 108 as they are stored at certain locations (e.g., in a warehouse). The sensors 152 may be configured to read bar codes, RFID or other identification features or tags to determine the identification of a particular article 108 or mover 16. Using such information, the supervisory controller 110 may provide a visual display on a Human Machine Interface (HMI) representing where each mover 16 and/or article 108 is physically located within the LDT system 10. In some embodiments, the supervisory controller 110 may store tag IDs and an associate batch IDs in a database with details of production for each associated batch for historical analysis purposes. Such a database, which may be stored in the memory 202, could be used to analyze and determine certain things about process operation and system components. For example, the database could be analyzed to determine which paths of the LDT system 10 need maintenance or to determine details about a batch based on product specifications. The batch ID could be scanned at the same time with a same or different system as the tag identification system (e.g., the sensors 152) used for the movers and/or articles 108. Batch IDs could be digitally maintained and/or printed on production features (e.g., a production tray) as a visual identification for users (e.g., technicians) of the system. This would facilitate verification or matching of manufactured or processed products with production tooling that was utilized in its manufacture or processing.

Figure 6:
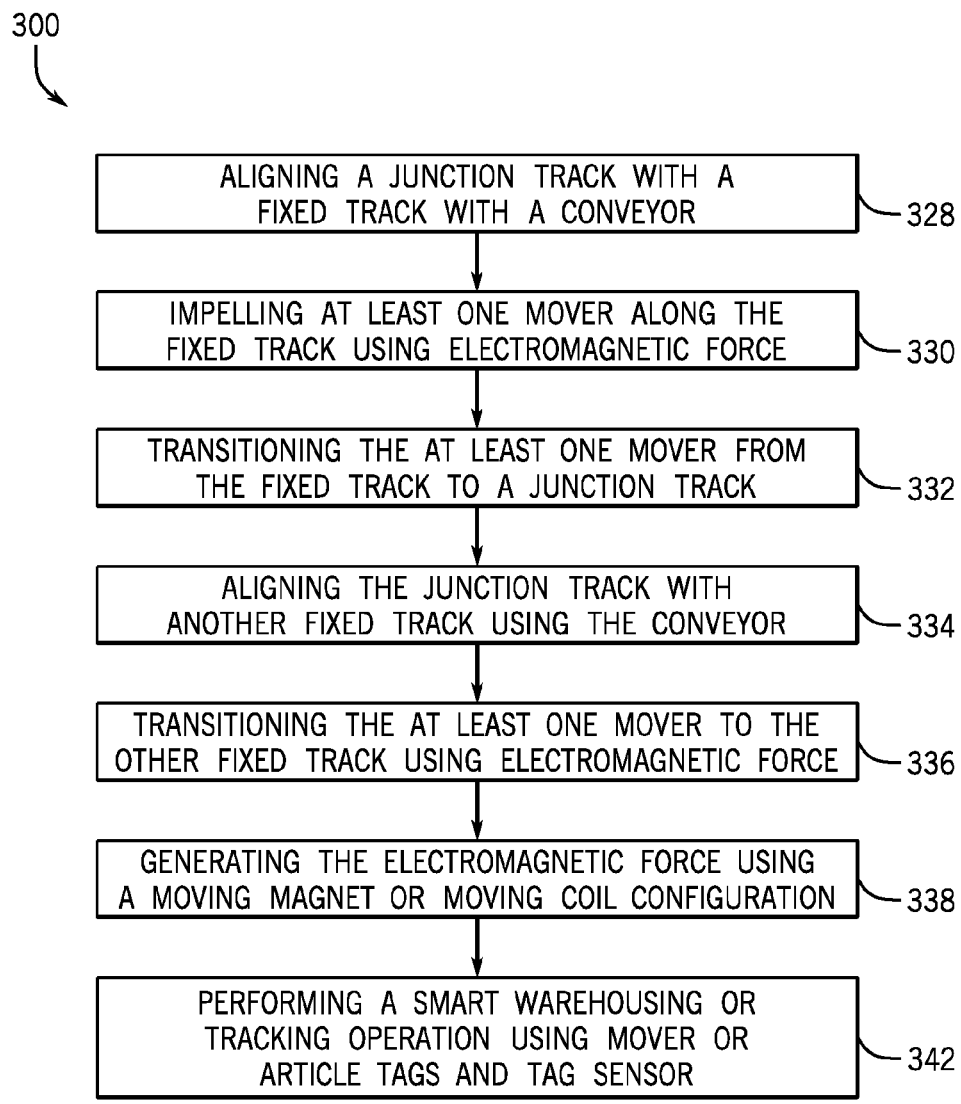
FIG. 6 is a block diagram of a method in accordance with present embodiments.

FIG. 6 is a block diagram of a method 300 of positioning movers in a LDT system in accordance with present embodiments. The method 300 includes aligning (block 328) a junction track with a first fixed track of a plurality of fixed tracks by moving the junction track with a conveyor on which the junction track is disposed. The method 300 also includes impelling (block 330) at least one mover along the first fixed track, transitioning (block 332) the at least one mover from the first fixed track to the junction track, aligning (block 334) the junction track with a second fixed track of the plurality of fixed tracks using the conveyor, and transitioning (block 336) the at least one mover to the second fixed track under the influence of electromagnetic force resulting from interaction between at least one electromagnet coil and at least one permanent magnet. The method 300 also includes generating (block 338) the electromagnetic force using interactions between an array of permanent magnets in the at least one mover and a series of electromagnet coils in the first fixed track and the junction track or generating the electromagnetic force using interactions between the array of permanent magnets in the at least one mover and a portion of the series of electromagnet coils in the second fixed track. Further, the method 300 may include performing (block 342) a smart warehousing or process tracking operation by monitoring a tag on the at least one mover with tag detectors positioned proximate at least the first and second fixed tracks and communicating with a supervisory control system.

Figure 7:
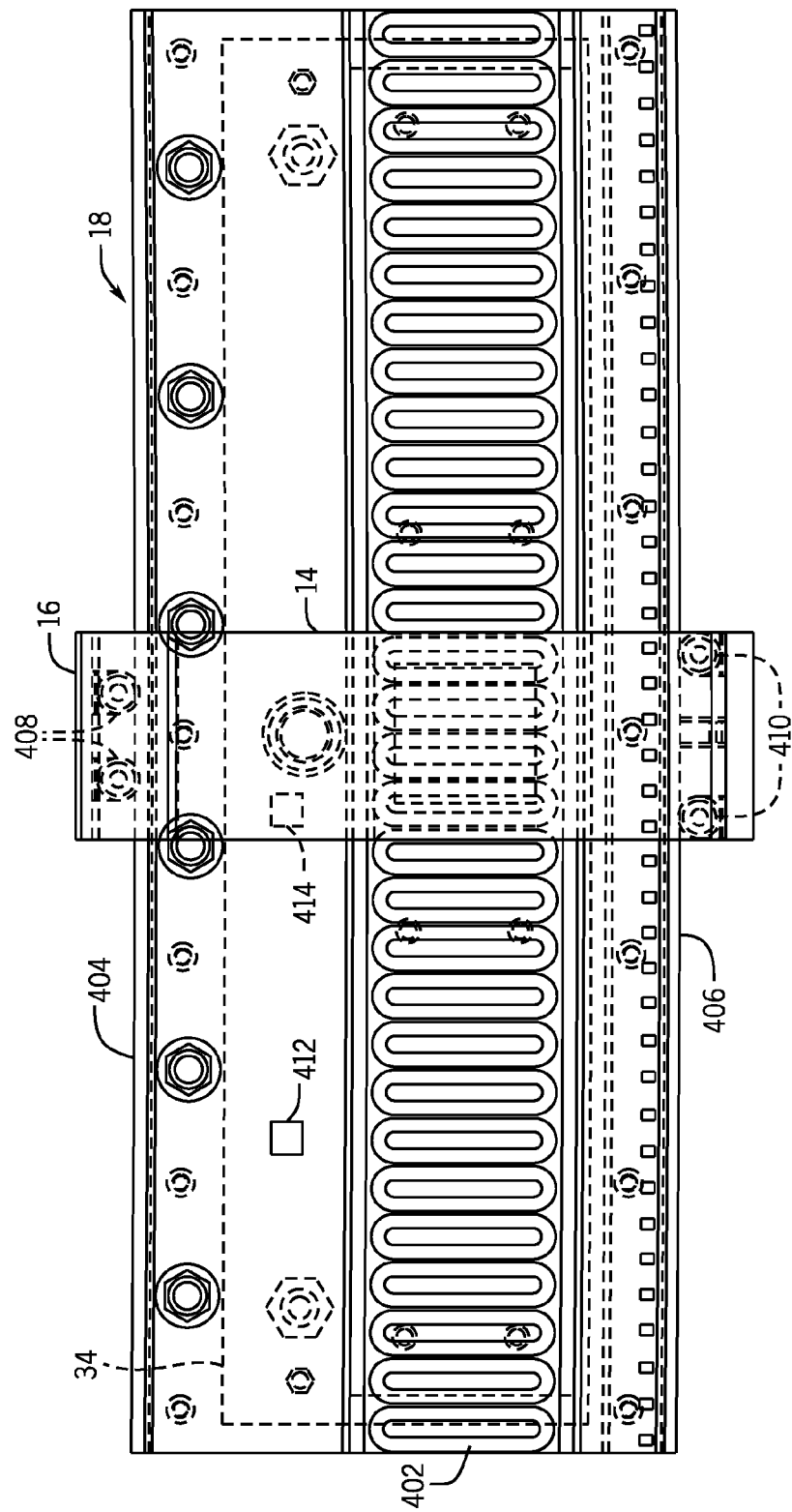
FIG. 7 is an overhead view of a portion of a linear drive transport system incorporating a tag and a tag reader or sensor in accordance with present embodiments.

As discussed above, present embodiments may utilize tags and tag sensors to track articles 108 and/or movers 16 to facilitate process management operations (e.g., smart warehousing). In some embodiments, this includes incorporating respective tags and sensors into the track, movers, and articles. In accordance with present embodiments, this may be done in specific ways to facilitate operation. For example, FIG. 7 illustrates an overhead, schematic view of a moving magnet system in accordance with present embodiments. A mover 16 is illustrated traversing a track 18, which includes a plurality of coils 402. The mover 16 includes a body 14 that spans the width of the track 18 and engages it on opposite sides 404, 406 with wheel sets 408, 410. The feedback board 34 represented as residing under the coils 402 may operate to detect and facilitate control of positional characteristics of the mover 16 relative to the track 18. To supplement this, a sensor 412 is integrated into the track 18 and positioned to detect a tag 414 integrated with or attached to the mover 16. Specifically, the tag 414 and the sensor 412 are positioned such that when the mover 16 traverses the track 18, the tag 414 can be read by the sensor 412. In other embodiments, the tag 414 and the sensor 412 may be positioned oppositely. That is, the tag 414 may be integrated with or attached to the track 18 and the sensor 412 may be coupled with the mover 16. For systems wherein it is preferable to provide power to the sensor 412 via the track 18, the illustrated embodiment may be utilized.

Figure 8:
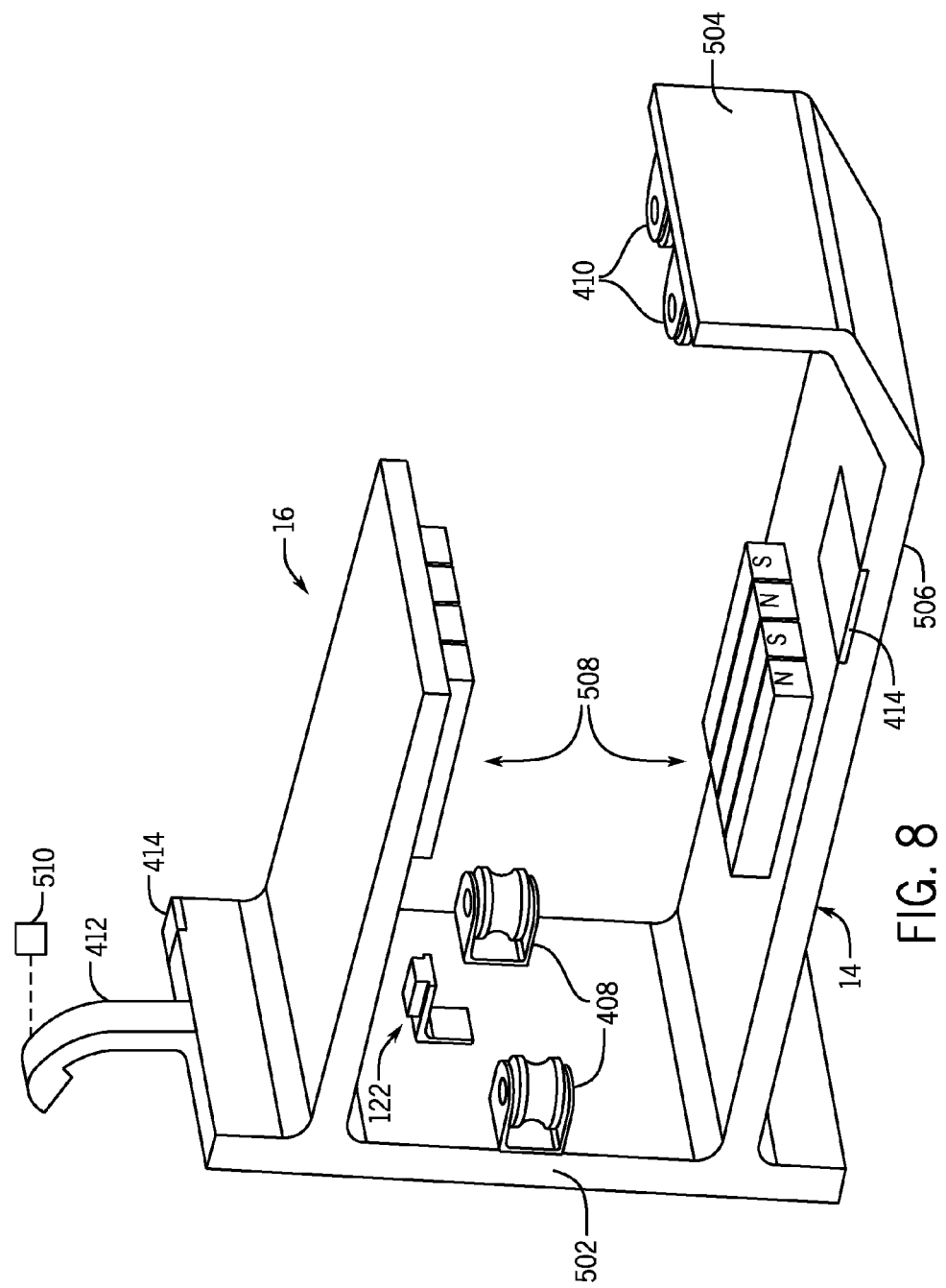
FIG. 8 is a perspective view of a mover incorporating a tag reader or sensor in accordance with present embodiments.

In yet other embodiments, it may be useful to include a reader on the mover 16 to facilitate identification of articles 108 being transported, as illustrated in FIG. 8. Specifically, FIG. 8 illustrates a mover 16 incorporating a sensor 412 (e.g., a barcode reader or RFID reader) that is configured to read a tag 414 disposed on an article 108 that is being transported by the mover 16. In the illustrated embodiment, the mover 16 includes a carriage body 14 that is configured to physically engage a track 18 with two wheel sets 408, 410 that are respectively positioned on a central body 502 and an extension 504 from an arm 506 of the body 14. It should be noted that the illustrated mover 16 is configured for operation in a moving magnet system, as is clear from the inclusion of a magnet array 508. However, other embodiments may be configured for moving coil operation. The sensor 412 may include integral electronics 510 (e.g., a power source, communication device) that facilitate operation. For example, the electronics 510 may include a battery and communication features that facilitates wireless communication with the supervisory system 110. Also, in the embodiment illustrated by FIG. 8, the mover 16 includes tags 414 that facilitate identification of the mover 16 by other system sensors 152 that are disposed off of the mover 16.

While only certain features of present embodiments have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A linear drive transport system, comprising:
a plurality of fixed tracks;
a junction track disposed on a conveyor configured to align the junction track with each of the plurality of fixed tracks, wherein the plurality of fixed tracks and the junction track comprise one of electromagnetic coils or permanent magnets arranged in series along the respective plurality of fixed tracks and the junction track, and wherein the conveyor comprises a linear drive;
a plurality of movers configured to move along the plurality of fixed tracks and configured to transition between each of the plurality of fixed tracks and the junction track when aligned, wherein the movers comprise the other of the electromagnetic coils or the permanent magnets; and at least one sensor disposed at one end of each of the plurality of fixed tracks, wherein the at least one sensor is configured to identify at least one of the plurality of movers that traverses at least one respective fixed track of the plurality of fixed tracks.

2. The system of claim 1, wherein the conveyor comprises a moving magnet linear drive and the junction track is disposed on a mover of the moving magnet linear drive.

3. The system of claim 1, wherein the conveyor comprises a moving coil linear drive and the junction track is disposed on a mover of the moving coil linear drive.

4. The system of claim 1, comprising a maintenance track configured to divert at least one of the plurality of movers for maintenance.

5. The system of claim 1, wherein the plurality of fixed tracks is substantially aligned within a plane and wherein the conveyor comprises a transversely oriented linear drive configured to move the junction track along a path transverse to the plurality of fixed tracks and to align with at least one additional fixed track arranged outside of alignment with the plurality of fixed tracks.

6. The system of claim 1, comprising an additional plurality of fixed tracks, wherein the additional plurality of fixed tracks includes at least a subset of fixed tracks along which the plurality of movers are configured to move.

7. The system of claim 1, comprising an additional junction track disposed on an additional conveyor configured to align the additional junction track with one or more of the plurality of fixed tracks, the junction track disposed on the conveyor, or both.

8. The system of claim 1, comprising the junction track and the conveyor positioned between the plurality of fixed tracks and one or more additional fixed tracks, wherein the conveyor is configured to align the junction track with the one or more additional fixed tracks to facilitate transition of a one of the plurality of movers between the junction track and the one or more additional fixed tracks.

9. The system of claim 8, wherein the one or more additional fixed tracks are arranged between the conveyor on which the junction track is disposed and an additional conveyor on which an additional junction track is disposed, the additional conveyor configured to align the additional junction track with the one or more additional fixed tracks.

10. A shuttle system for a linear drive transport system, comprising:

a first conveyor configured to move along a path that is transverse to a plurality of linear drive tracks that are configured to transport a linear drive mover in one of a moving magnet configuration or a moving coil configuration, wherein the first conveyor comprises a linear drive;

a junction track disposed on the first conveyor, wherein the junction track is configured to transport the linear drive mover in the same one of the moving magnet configuration or the moving coil configuration as the plurality of linear drive tracks and wherein the first conveyor is configured to align the junction track with at least a first subset of the plurality of linear drive tracks to facilitate transfer of the linear drive mover there between; and a second conveyor configured to move along a path that is transverse to a direction of movement of the junction track disposed on the first conveyor, wherein the second conveyor is configured to move the junction track and the first conveyor to align the first conveyor to a first subset or a second subset of the plurality of linear drive tracks, wherein the first subset of the plurality of linear drive tracks and the second subset of the plurality of linear drive tracks are disposed on different parallel planes.

11. The shuttle system of claim 10, wherein the first conveyor comprises a moving magnet linear drive and the junction track is disposed on a mover of the moving magnet linear drive.

12. The shuttle system of claim 10, comprising the plurality of linear drive tracks substantially aligned within a plane, wherein the path the first conveyor moves along is transversely oriented relative to the plane.

13. The shuttle system of claim 10, comprising the linear drive mover including a carriage configured to be disposed about a track segment of the plurality of linear drive tracks or the junction track.

14. The shuttle system of claim 13, wherein the linear drive mover comprises rollers configured to engage opposite sides of the track segment.

15. The shuttle system of claim 13, wherein the linear drive mover comprises a tag detector configured to read a tag on an article engaged for transportation via the linear drive mover, the tag detector configured to communicate with a supervisory controller configured to monitor locations of articles within the linear drive transport system.

16. A method of positioning movers in a linear drive transport system, comprising:

aligning a first conveyor to a first subset of a plurality of fixed tracks, wherein the first subset of the plurality of fixed tracks is parallel to a second subset of the plurality of fixed tracks positioned above or below the first subset of the plurality of fixed tracks, wherein the first conveyor is configured to move a junction track to a first fixed track of the plurality of fixed tracks in a single plane;

aligning the junction track with the first fixed track of the plurality of fixed tracks by moving the junction track with the first conveyor on which the junction track is disposed by employing electromagnetic propulsion; and impelling at least one mover along the first fixed track, transitioning the at least one mover from the first fixed track to the junction track, aligning the junction track with a second fixed track of the plurality of fixed tracks using the first conveyor, and transitioning the at least one mover to the second fixed track under the influence of electromagnetic force resulting from interaction between at least one electromagnet coil and at least one permanent magnet.

17. The method of claim 16, comprising generating the electromagnetic force using interactions between an array of permanent magnets in the at least one mover and a series of electromagnet coils in the first fixed track and the junction track.

18. The method of claim 17, comprising generating the electromagnetic force using interactions between the array of permanent magnets in the at least one mover and a portion of the series of electromagnet coils in the second fixed track.

19. The method of claim 17, wherein moving the junction track with the conveyor comprises moving a linear drive mover of the first conveyor on which the junction track is disposed along a linear drive track of the first conveyor, wherein the linear drive mover and the linear drive track of the first conveyor are in one of a moving magnet or moving coil configuration.

20. The method of claim 16, comprising performing an automated warehousing operation by monitoring a tag on the at least one mover with tag detectors positioned proximate at least the first and second fixed tracks and communicating with a supervisory control system to facilitate process management operations.

\* \* \* \* \*